April 1, 1969    J. D. PATERSON ET AL    3,435,931

DRIVE COUPLINGS

Filed March 6, 1967

United States Patent Office 3,435,931
Patented Apr. 1, 1969

3,435,931
DRIVE COUPLINGS
James Deas Paterson, Middlesex, and Gerald George Sommerville, Wimbledon, London, England, assignors to Rotax Limited, London, England
Filed Mar. 6, 1967, Ser. No. 620,742
Int. Cl. F16d 11/00, 13/04, 23/00
U.S. Cl. 192—46                                2 Claims

ABSTRACT OF THE DISCLOSURE

A drive coupling for transmitting rotary motion comprising an input member and an output member and ratchet means interconnecting the input and output members, one part of said ratchet means being connected to one of the members by means of a hollow truncated conical part having two stable conditions, in one of which the ratchet means is engaged and in the other of which the ratchet means is disengaged, relative angular movement of the ratchet means serving to move the conical part to its other stable condition thereby to maintain the ratchet means out of engagement.

---

This invention relates to drive couplings for transmitting rotary motion and has for its object to provide such a coupling in a simple and convenient form.

A drive coupling in accordance with the invention comprises in combination, an input member and an output member, ratchet means through which drive can be transmitted from the input member to the output member, a hollow truncated conical part having two stable conditions, said conical part serving to hold the parts of said ratchet means in engagement when in one stable condition, said ratchet means being arranged so that when the output member rotates faster than the input member, relative movement of the parts of the ratchet means will occur and said conical part will be moved to its other stable condition in which the parts of the ratchet means are no longer held in engagement.

Figure 1:
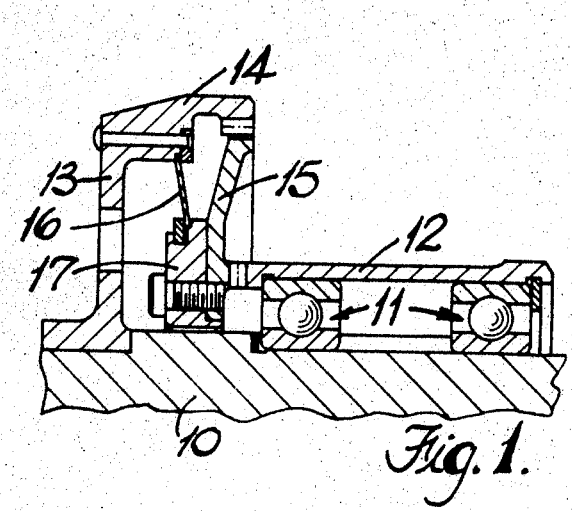
Figure 2:
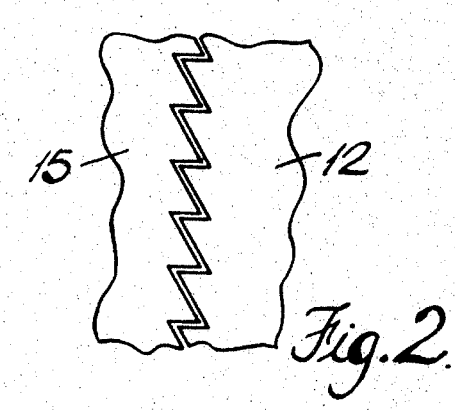

In the accompanying drawings:

FIGURE 1 is a sectional side elevation of the upper half of one example of a drive coupling in accordance with the invention and FIGURE 2 is a developed view of two parts of the coupling FIGURE 1.

Referring to the drawings there is provided a rotary shaft 10 which is arranged to be driven by any convenient means such for instance as an electric motor. Supported on bearings 11 about the shaft is an output member in the form of a hollow cylindrical sleeve 12 this being in use, connected to means to be driven by the motor such for instance as an engine. The shaft 10 projects beyond one end of the sleeve 12 and secured to this portion of the shaft is the boss of an input member 13 of disc form and having an annular flange 14 formed on its periphery extending in the direction of the sleeve.

Around the internal periphery of the flange 14 are formed axially extending teeth which mesh with complementary teeth formed on the periphery of an intermediate member 15 of dished annular form. The end of the sleeve 12 adjacent the intermediate member 15 is shaped to define saw tooth shaped teeth (FIGURE 2) which can mesh with complementary teeth formed on the adjacent portion of the intermediate member 15. It will be realized that the saw tooth teeth constitute ratchet means and if the teeth are held in engagement drive can be transmitted from the shaft 10 to the sleeve 12 providing the teeth are cut in the appropriate manner. If, however, the sleeve 12 tends to rotate more quickly than the shaft 10 the teeth will generate an axial force which will move the intermediate member 15 axially to effect disengagement of the teeth.

For holding the teeth in engagement a hollow truncated conical part 16 is provided. The cone angle of the part is approximately 140° but this is not essential and such a part has two stable conditions. The outer periphery of the conical part is secured to the flange 14 and the inner periphery thereof is secured to a ring member 17 which in turn is secured to the intermediate member 15. In use, in one stable condition the conical part 16 will hold the teeth of the ratchet means in engagement thereby allowing the drive to be transmitted but when the intermediate member is moved axially the conical part will be moved to its other stable condition in which it will hold the teeth of the ratchet means out of engagement. By this means in the particular example when the motor has started the engine, the teeth of the ratchet means will be disengaged and will remain disengaged. When it is required to start the engine the conical part is moved to its one stable position by any convenient means.

In an alternative arrangement (not shown) the intermediate member is omitted and the teeth which were on this member are formed on a member which is mounted on the conical part. This arrangement operates in the same manner but it will be realized that the torque carrying capacity of the coupling is much lower since the wall of the conical part cannot be very thick otherwise its flexibility is impaired.

Having thus described our invention what we claim as new and desire to secure by Letters Patent is:

1. A drive coupling for transmitting rotary motion and comprising in combination, an input member, an output member and an intermediate member, a ratchet means through which drive can be transmitted between the intermediate member and the output member, one part of said ratchet means being formed on the input member and the other part of the ratchet means being formed on the output member, and a hollow truncated conical part having two stable conditions the radial external and internal peripheries of said conical part being secured respectively to the input member and the intermediate member, said conical part serving in one stable position to retain the parts of the ratchet means in engagement thereby to enable drive to be transmitted between the input member and the output member by way of said intermediate member, the conical part being moved to its other stable position in which the parts of said ratchet means are held out of engagement when the output member rotates faster than the input member.

2. A drive coupling according to claim 1 including an annular flange portion formed integrally with the input member and to which the external priphery of the conical part is secured, said intermediate member being of disc like form and having axial spline engagement with the flange of the input member.

References Cited

UNITED STATES PATENTS

| 869,820 | 10/1907 | Winans | 192—46 |
|---|---|---|---|
| 2,061,220 | 11/1936 | Cotterman | 192—46 |
| 3,252,553 | 5/1966 | Peterson | 192—46 XR |
| 3,319,755 | 5/1967 | Digby | 192—46 XR |

CARLTON R. CROYLE, *Primary Examiner.*

ALLAN D. HERRMANN, *Assistant Examiner.*

U.S. Cl. X.R.

192—89